July 14, 1936.  E. C. McFARLANE  2,047,792
POWER TRANSMISSION MECHANISM
Filed Feb. 17, 1932   11 Sheets-Sheet 3
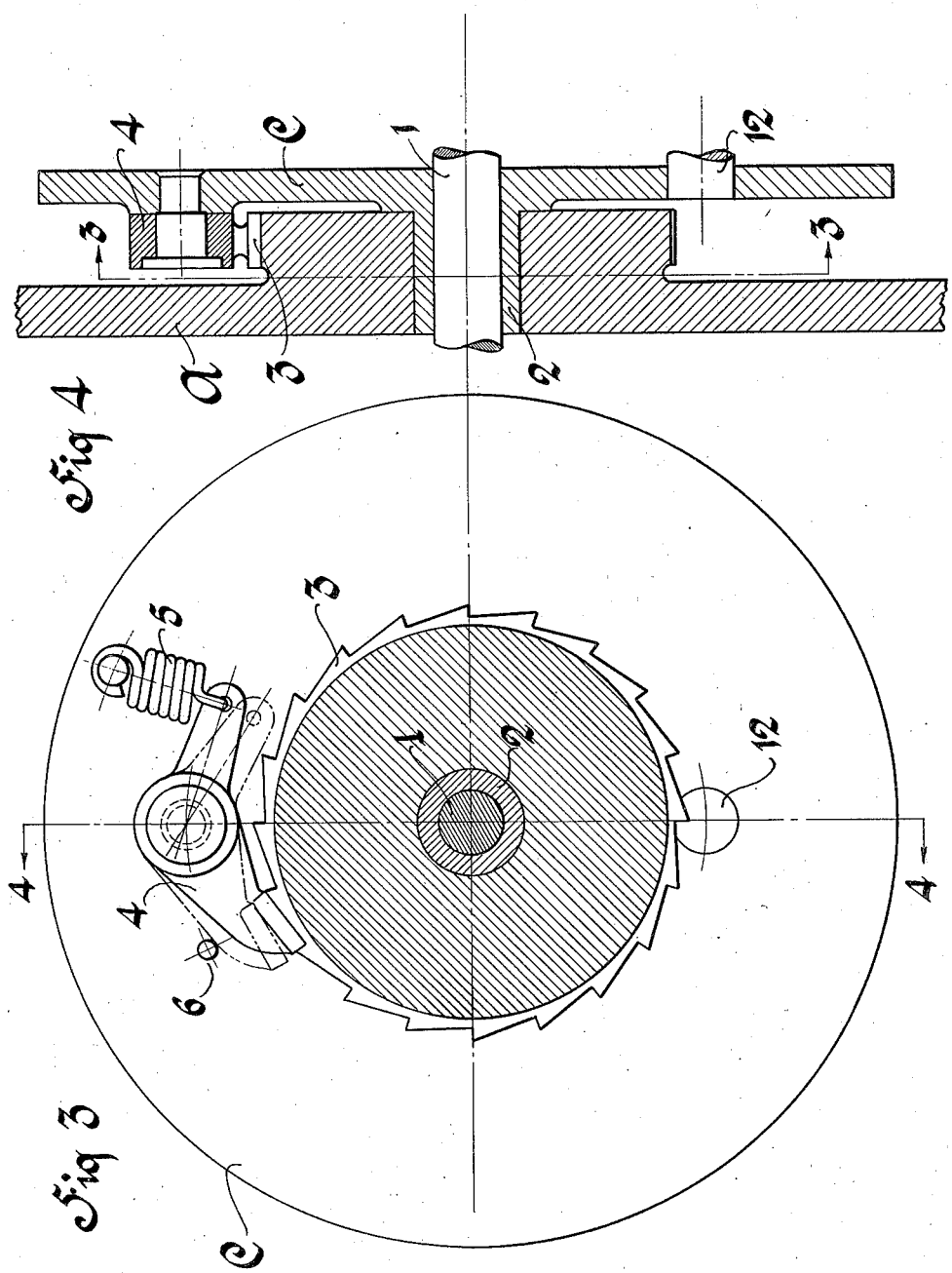
INVENTOR
Edwin C. McFarlane
BY
Chas. McC. Chapman
ATTORNEY July 14, 1936.  E. C. McFARLANE  2,047,792
POWER TRANSMISSION MECHANISM
Filed Feb. 17, 1932   11 Sheets-Sheet 4
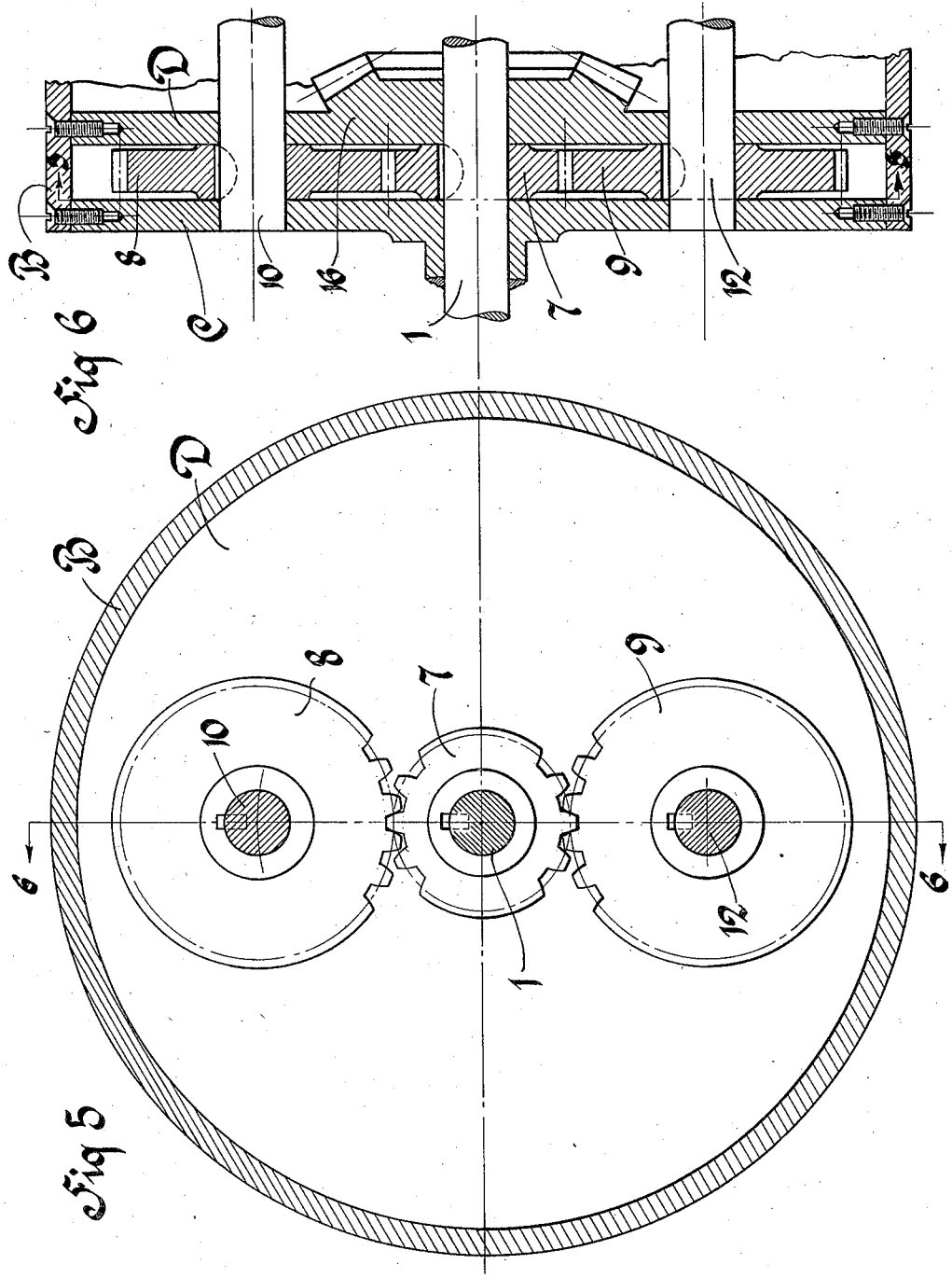
INVENTOR
Edwin C. McFarlane
BY
Chas. McC. Chapman
ATTORNEY

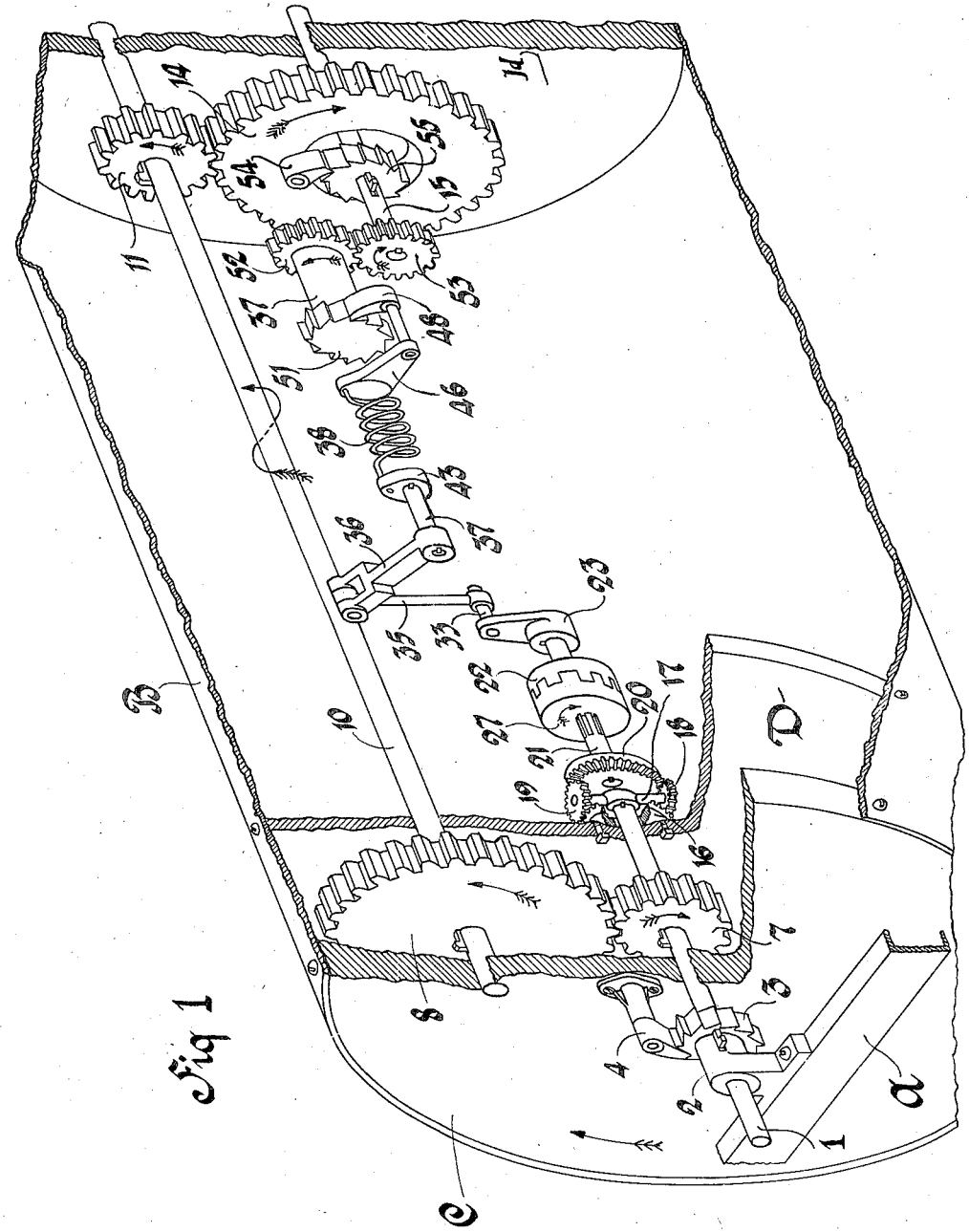

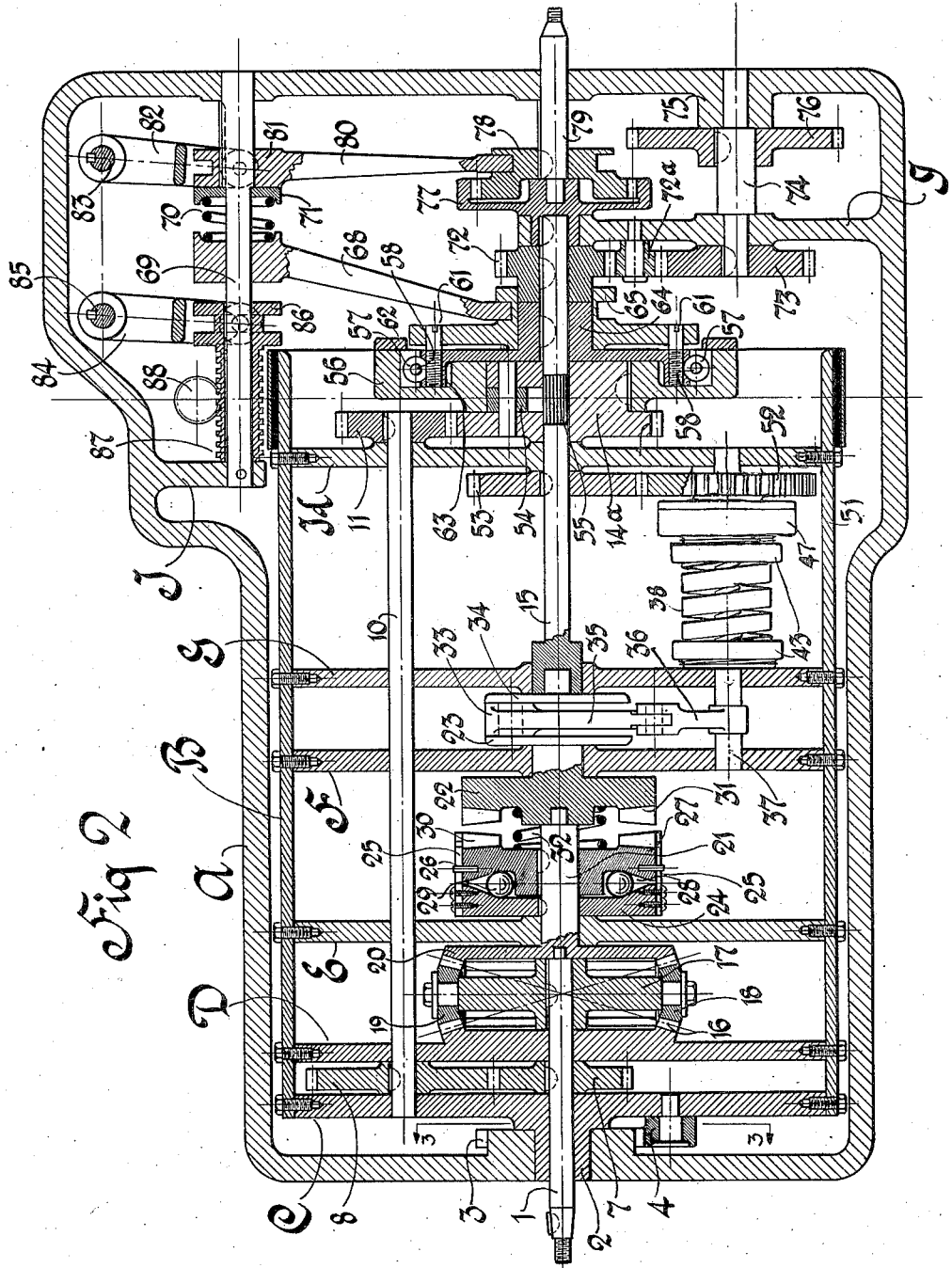

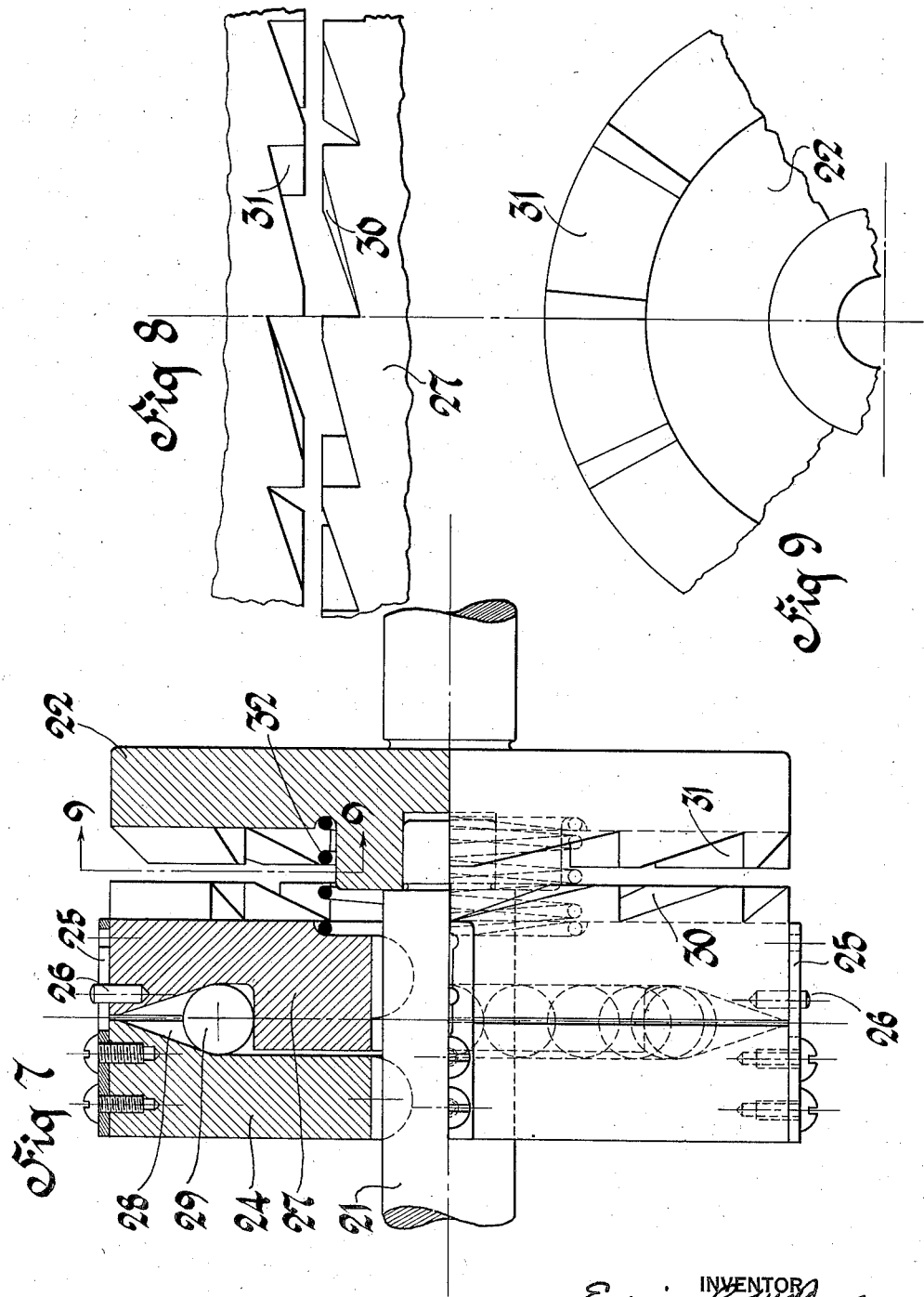

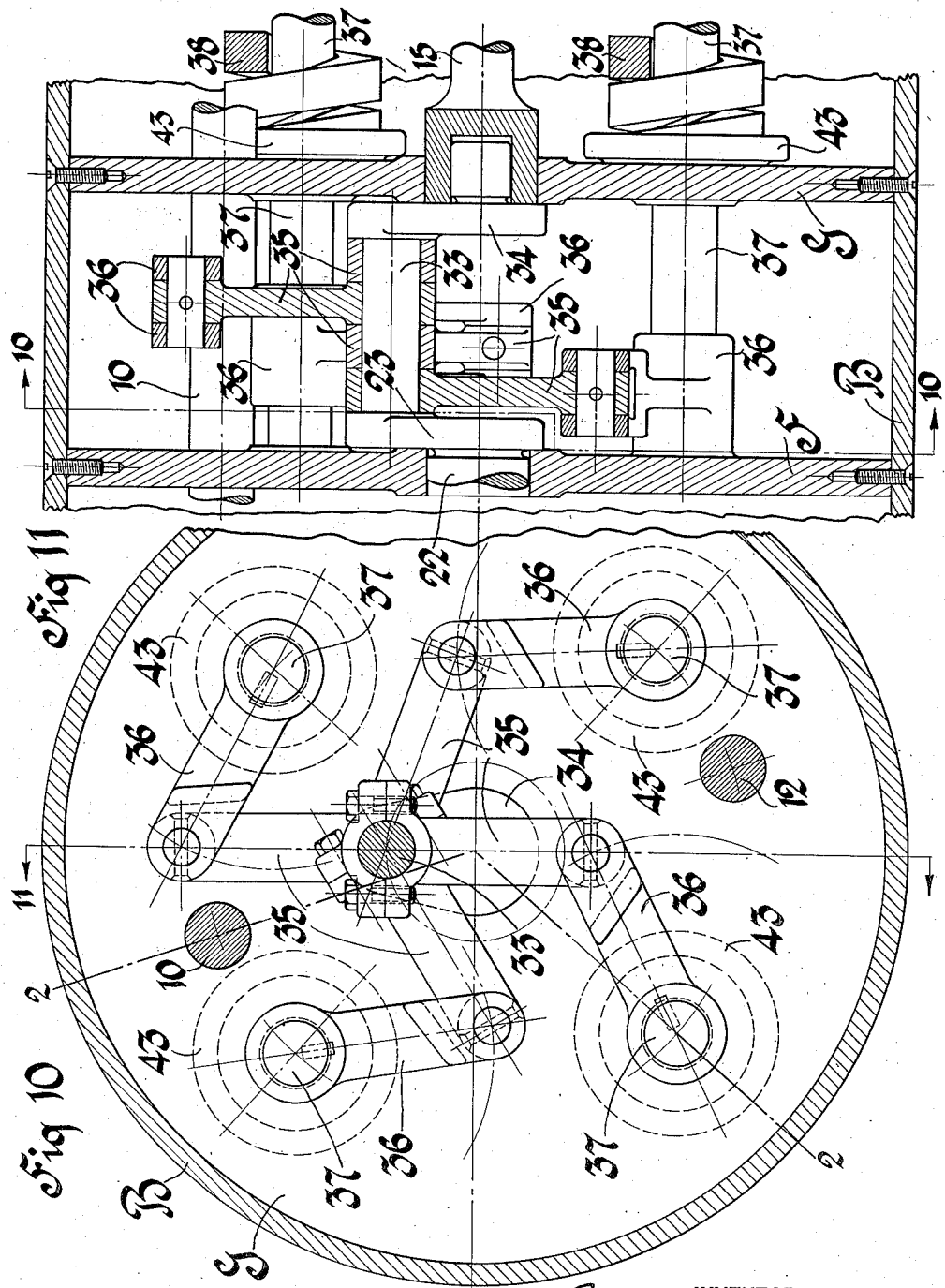

July 14, 1936.   E. C. McFARLANE   2,047,792
POWER TRANSMISSION MECHANISM
Filed Feb. 17, 1932   11 Sheets-Sheet 7
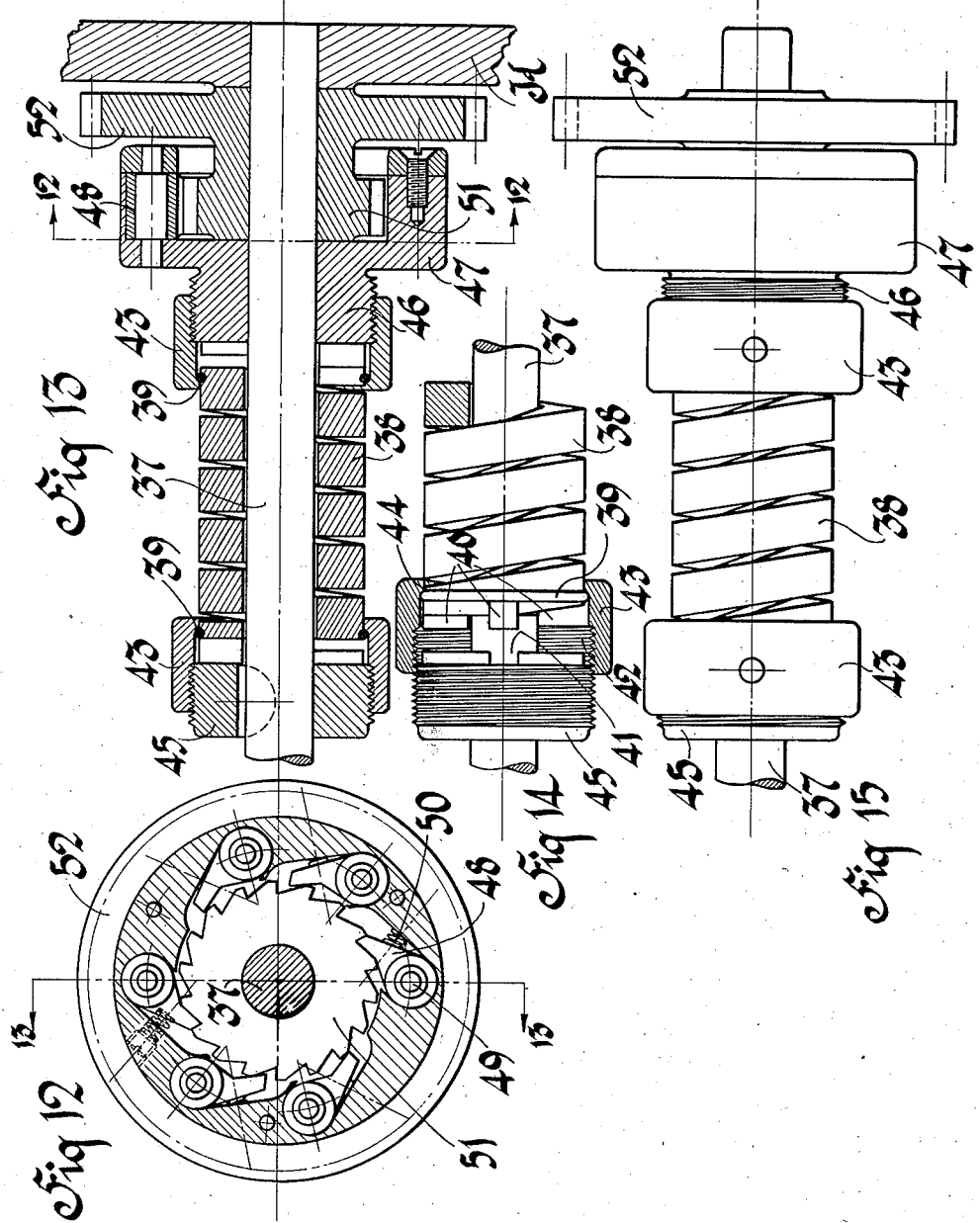
INVENTOR
Edwin C. McFarlane
BY
Chas. M. C. Chapman
ATTORNEY July 14, 1936.  E. C. McFARLANE  2,047,792
POWER TRANSMISSION MECHANISM
Filed Feb. 17, 1932   11 Sheets-Sheet 8
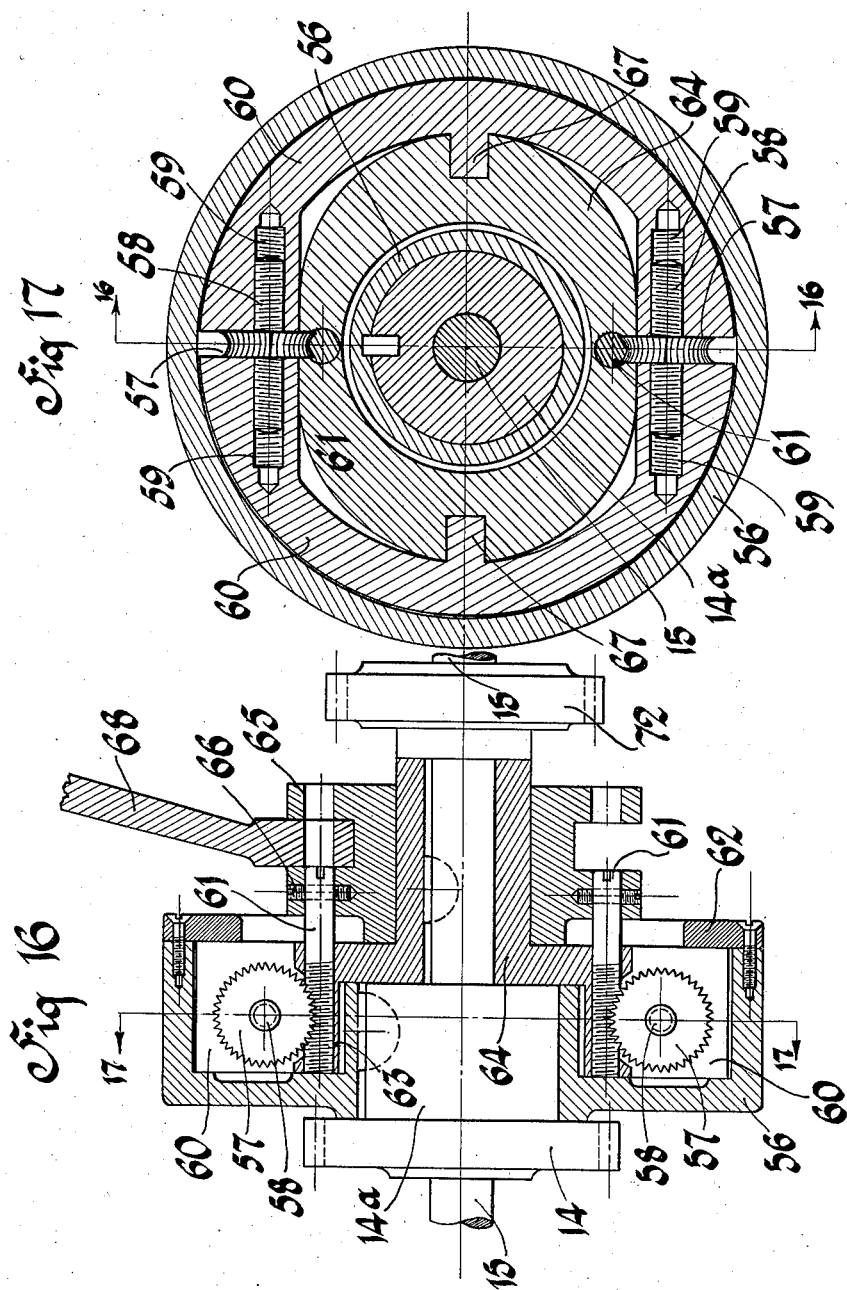

July 14, 1936. E. C. McFARLANE 2,047,792
POWER TRANSMISSION MECHANISM
Filed Feb. 17, 1932 11 Sheets-Sheet 9
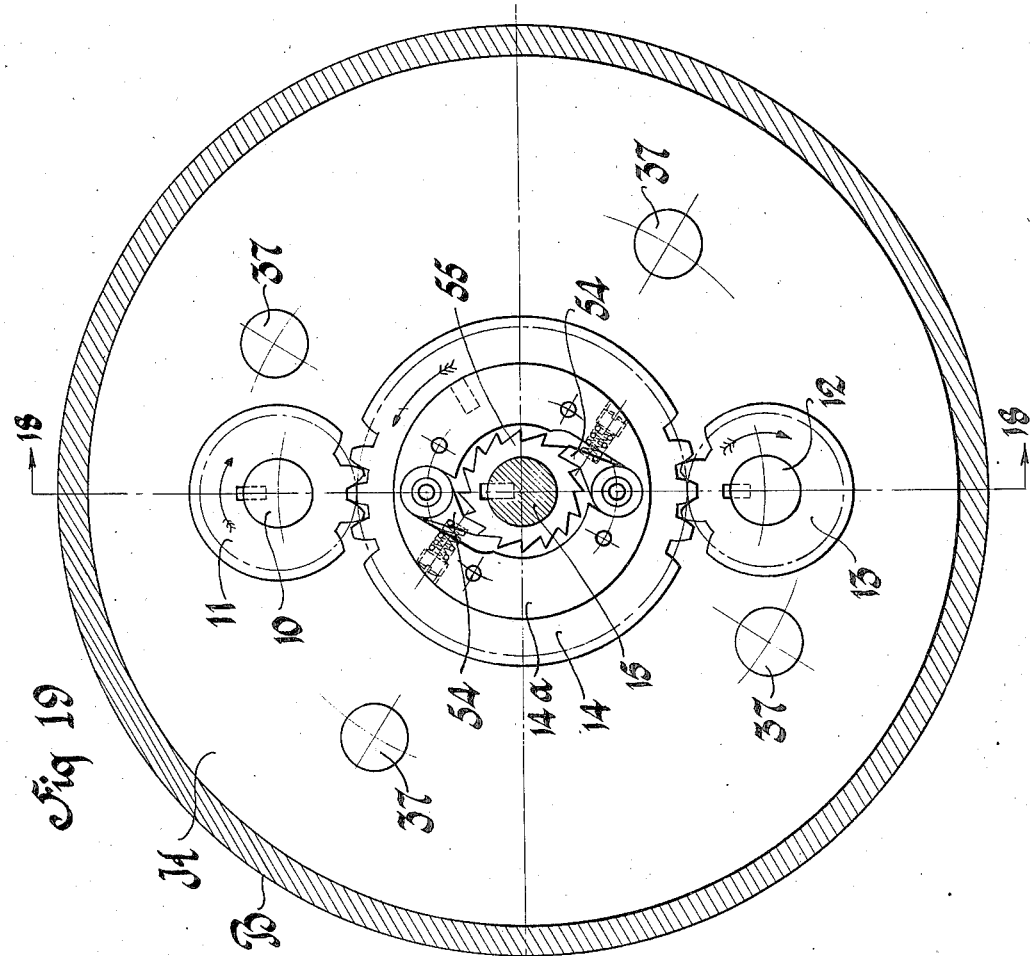
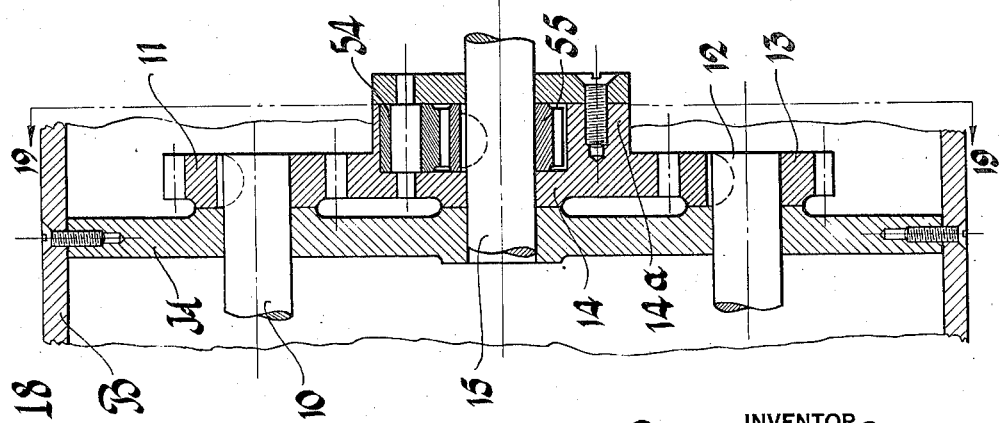
INVENTOR
Edwin C. McFarlane
BY
Chas. McC. Chapman
ATTORNEY

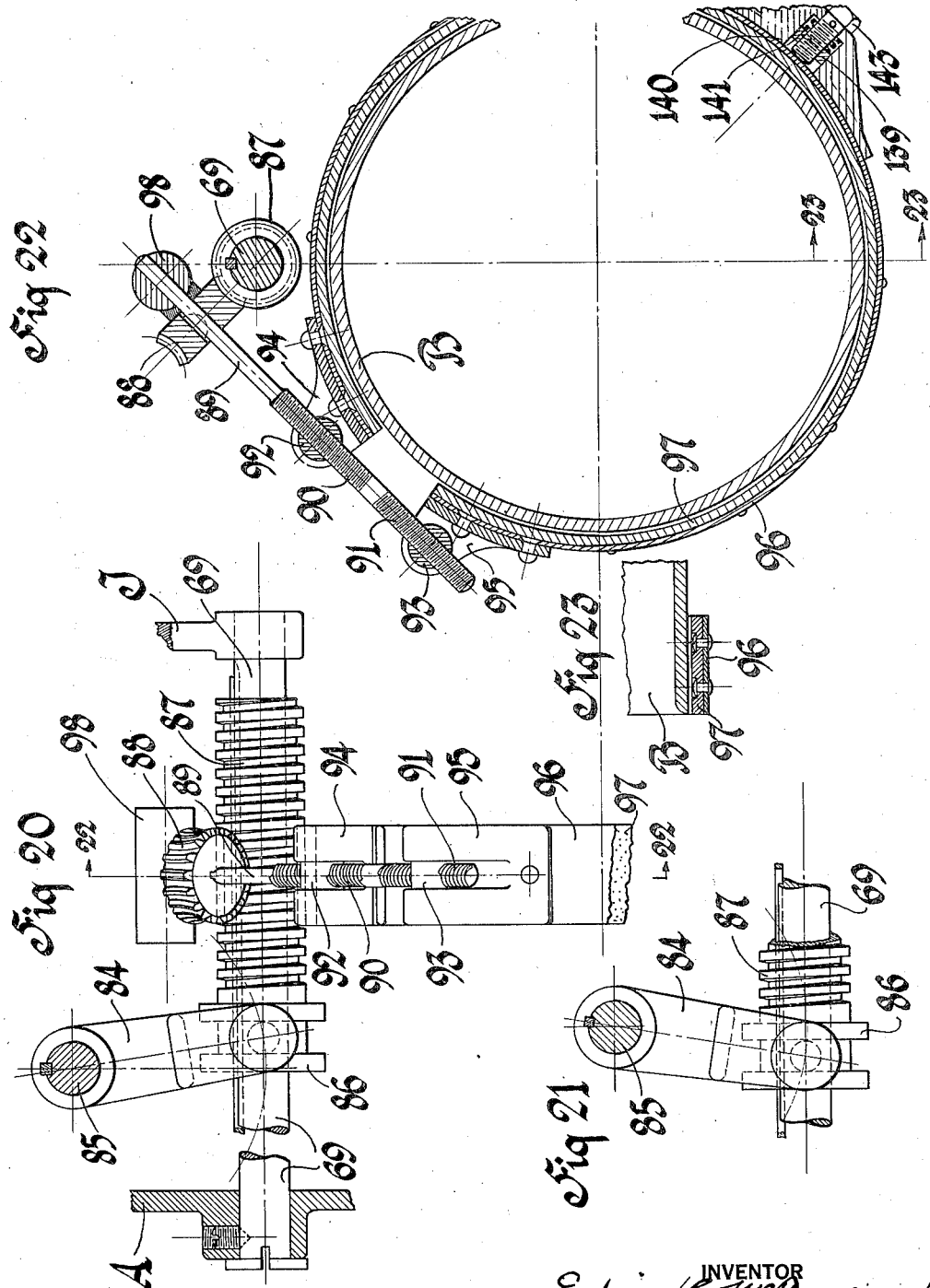

July 14, 1936.  E. C. McFARLANE  2,047,792
POWER TRANSMISSION MECHANISM
Filed Feb. 17, 1932   11 Sheets-Sheet 11

INVENTOR
Edwin C. McFarlane
BY Chas. McC. Chapman
ATTORNEY

Patented July 14, 1936

2,047,792

UNITED STATES PATENT OFFICE 2,047,792

POWER TRANSMISSION MECHANISM

Edwin C. McFarlane, Pearl River, N. Y.

Application February 17, 1932, Serial No. 593,457

3 Claims. (Cl. 74—115)

This invention relates to the art of motor vehicles in which latter are employed hydrocarbon engines for the prime mover or activating means, and particularly the invention has reference to a so-called transmission mechanism wherein, during the translation of the power from the point of derivation to the point of application, load or use of the power, a flexible medium is intervened in which power is stored for utilization in various ways during the operation of the mechanism.

In carrying out my invention, I accomplish a number of important functions and objects, among which may be noted the following: to provide means by which power is applied positively, for various work purposes under varying conditions of load, travel and speed, through the medium of a yielding connection; to provide, in the mechanism set forth in the foregoing, a simple, positive and direct controlling means which can be readily activated, which occupies comparatively little space, and which may be located at any desired point adjacent the driver's seat, considering a road vehicle, preferably on the steering wheel; to provide a motor vehicle power transmission means which is positive in application of its power and which can be entrained with the motor as an integral part of the vehicle drive, or which can be built as an independent unit and readily combined with the motor; to provide a positively driven, inherently yielding, transmission mechanism for motor vehicles which is under perfect control for all the various purposes required in the operation of a road vehicle, such as the forward drive, reverse drive, free wheeling, and free wheeling cut-out, and which embodies means to cause the driven mass to accelerate the motor, and means to prevent the mass from going into a reverse motion when the activating means is in a forward directional connection; to provide, in motor vehicles, a transmission mechanism which may be utilized to cause the prime mover to decelerate the speed of the driven mass, or use the motor as a retarding means; to provide a transmission mechanism with a yielding or flexible device or unit capable of performing the following important functions, viz.: To transmit power from a crank to a one-way driving ratchet so as to positively start the car, when the engine is activated, by the application of power to a shaft in suchwise that the mass is given a positive forward impulse through gearing connected to said shaft; to so connect the governor and driving shaft as that, at a predetermined speed, as ten miles an hour, for example, said device endeavors to cause a driven shaft to run at a predetermined speed relatively to the driving shaft; assuming that the car is performing its normal function and is traveling along in conventional high gear, to cause all the parts contained within the unit to cease working independently and become an inert mass, so that the unit itself revolves and takes part in the transmission; to cause the engine to operate as a brake or retarder by gripping the drum and compelling the motor to turn over several times as fast as the driven parts; to enable the free wheel cut-out control to be brought into action, when going along in forward drive, and prevent the mass being driven from becoming suddenly retarded or suddenly jerked to assume the new speed ratio; to bring about the same results, or the same effects, when a further reduction is desired, by the use of a gear brake; and to provide between the driving means and the driven means or mass to be driven, a yielding or flexible connection contained, with other essential parts of the driving, braking and free-wheeling mechanisms, in an enclosing drum adapted to rotate and become an essential functional part of the power and driving mechanism.

With the above objects in view and others which will be detailed during the course of the description, my invention consists in the parts, features, elements and combinations thereof hereinafter described and claimed.

In order that my invention may be clearly understood, I have provided drawings wherein:

Figure 1 is a perspective view of the rotary drum, the parts shown therein being arranged in a schematic manner, and certain of the parts being broken away, and other parts being omitted for clarity, this view not being intended to portray the parts with meticulous accuracy and being distorted in some respects;

Figure 2 is a horizontal section, taken approximately on the irregular line 2—2, Figure 10, some duplicate parts being omitted for clarity, and certain other parts being represented in slight deviation from their true size and form;

Figure 3 is an enlarged sectional elevation taken on the line 3—3 of both Figures 2 and 4, the casing or frame A being omitted;

Figure 4 is a cross sectional view taken on the line 4—4 of Figure 3;

Figure 5 is a sectional view taken on the line 5—5 of Figure 6;

Figure 6 is a sectional view taken on the line 6—6 of Figure 5;

Figure 7 is a sectional elevation of the governor mechanism shown in Figure 2;

Figure 8 is a plan view enlarged of a portion of the toothed members of the governor;

Figure 9 is a front elevation of a portion of one of the toothed members of the governor shown in Figure 8, the view being on the line 9—9 of Figure 7;

Figure 10 is a sectional elevation of the crank mechanism, shown in Figure 2, for transmitting motion from the power shaft to the spring shafts, this view being taken on the line 10—10, Figure 11;

Figure 11 is a sectional elevation of the same mechanism taken on the line 11—11, Figure 10;

Figure 12 is a sectional elevation of the one-way, positive drive-clutch of the free-wheeling mechanism, this view being taken on the line 12—12 of Figure 13;

Figure 13 is a sectional view taken on the line 13—13 of Figure 12, including the flexible transmission means of the free-wheeling mechanism;

Figure 14 is a sectional elevation of a portion of the flexible power means of Figure 13 showing details of construction;

Figure 15 is an elevation of the mechanism shown in Figure 13;

Figure 16 is a sectional elevation of the free-wheeling cut-out mechanism shown near the right-hand end of Figure 2, the section being taken on the line 16—16 of Figure 17;

Figure 17 is a vertical sectional view of the mechanism shown in Figure 16, the section being taken on the line 17—17 of Figure 16;

Figure 18 is a sectional elevation of the forward part of the main driving mechanism shown in Figures 5 and 6 and disposed in the right-hand end of Figure 2, the section being taken on the line 18—18 of Figure 19;

Figure 19 is a front elevation of the mechanism shown in Figure 18, the casing being shown in section and the view being in the direction of the arrows of the line 19—19 of Figure 18;

Figure 20 is a sectional elevation of the adjusting means for the brake-band mechanism shown in Figure 22, the disposition of this adjusting means being in the upper, right-hand portion of the casing of Figure 2, the mechanism being in its locked position, and the drum being omitted;

Figure 21 is a detail view in elevation of a part of the mechanism shown in Figure 20, the adjustment being in the unlocked position of the brake-band;

Figure 22 is a transverse sectional view taken on the line 22—22, Figure 20, the view being in the direction of the arrows, this view being broken away on account of the limitations of the sheet;

Figure 23 is a sectional detail view taken on the line 23—23 of Figure 22;

Figure 25:
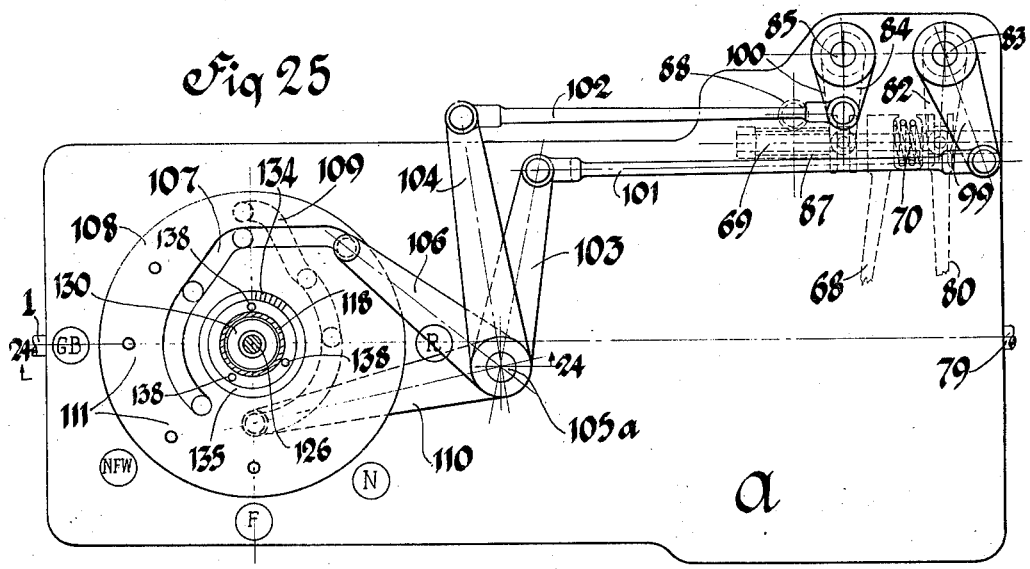
Figure 25 is a top plan view of the controlling mechanism shown in Figure 24, the details of the latter being omitted, and connections being shown to the rear controls shown in the upper-right-hand portion of Figure 2.

Referring to the drawings, A is a casing adapted to contain my transmission mechanism, and B is a rotary drum, forming part of such mechanism, journaled in the said casing A, at the engine or left end thereof, Figures 1 and 2. The drum is composed, preferably, of a tubular cylinder and occupies approximately two-thirds of the casing. The drum contains a plurality of diaphragms or supports shown as C, D, E, F, G and H rigidly but removably secured thereto and operating to give rigidity to the drum, form compartments for the several functional units, and provide journal bearings for the several shafts. By thus mounting the drum and enclosing the said functional units, all the parts can be made to run in oil tending to quietude and smoothness. Within the casing there are other supports I and J, for certain features, in the larger end of the casing.

Viewing Figures 1 and 2, it will be seen that driving shaft 1 is journaled in the hub 2 of the drum and passes through casing A and supports C and D, the support C having the extended hub 2 providing a journal for the adjacent end of the drum and affording a bushing in the casing for the shaft 1. The drum can thus turn freely in the casing and the shaft can rotate freely in the drum supports. The casing, at this point, has a ratchet wheel 3 fixed thereto and the adjacent support C carries a pivoted pawl 4, for cooperation with said ratchet, the drum thus being capable of free clockwise movement in the casing, looking in the direction of the driven shaft 79 from the left-hand end of Figures 1 and 2 the pawl, under spring control 5, holding the drum from reverse movement,—see Figures 3 and 4. The pin 6 limits the movement of the pawl. Shaft 1 has fixed thereto, between the supports C and D, a gear 7 meshing with gears 8 and 9 on opposite sides thereof, gear 8 being fixed to shaft 10 journaled in supports C and D and extending rearwardly through supports E, F, G and H and carrying at its rear end the gear 11,—see Figures 1, 2, 5 and 6. The gear 9 is fixed to the shaft 12 journaled in supports C and D, and extending rearwardly through supports E, F, G and H and carrying at its rear end the gear 13. Gears 11 and 13 mesh with gear 14, loose on shaft 15, journaled in supports G and H,—see Figures 18 and 19,—and carrying other devices as presently described. The gears 7, 8 and 9, and 11, 13 and 14 may have any desired ratio and preferably are given a ratio of 3½ to 1.

The support D, on its rear side, has fixed thereto a bevel crown-gear 16; and adjacent thereto on the end of the driving shaft 1 is fixed a multiple, diametric crank 17 carrying at its opposite ends freely rotatable bevel gears 18 and 19 in mesh with fixed gear 16, and also in mesh with a bevel crown gear 20, carried on a short shaft 21, journaled in support E, and centered at its rear end in the axis of freely rotatable clutch member 22 journaled in adjacent support F, and carrying at its end rearwardly of the latter a crank-arm 23. Adjacent the support E, on its rear side, the shaft 21 has fixed thereto friction clutch member 24 provided with a plurality of resilient snap-catches 25 adapted to engage pins 26 projecting from the circumference of complemental clutch member 27 mounted slidably on shaft 21. The two clutch members have cooperating, inner beveled faces forming a pocket 28 for the reception of balls 29, adapted by centrifugal action to force member 27 away from member 24 by overcoming the catches 25. The member 27 has on its rear face a plurality of teeth 30 adapted to engage the complemental teeth 31 on the adjacent face of clutch member 22. The two toothed members 22 and 27 are normally held apart by spring 32 surrounding the shaft 21. The enlarged detail Figures 7 to 9 make this structure clear, while Figure 1 shows the clutch diagrammatically, and Figure 2 shows it in relation to other parts.

The crank 23, adjacent the rear side of support F, is connected by a pin 33 to a similar crank 34. The pin pivotally supports a link 35, at one end, its other end being pivotally connected to a bifurcated crank-arm 36 on short shaft 37 journaled in the supports F and G at one end, and at its other end in support H. The said cranks and link are located between the supports F and G, resulting in steadiness of action. The crank 34 is centered in the axis of shaft 15 directly opposite the axis of crank 23. This crank mechanism is shown in detail in Figures 10 and 11, and it will be seen that the linkage connection to shaft 37 is duplicated on opposite sides of the longitudinal axial line of drive shaft 1, as are also the yielding power mechanisms forming part of the transmission as presently described. It is to be understood that the number of crank and yielding power mechanisms herein shown and described is suggestive only and is not to be taken as a limitation. The shaft 37 is encircled by a heavy spiral spring 38, the opposite ends of which are grooved to receive a spring ring 39 provided with a plurality of lugs 40,—see particularly the details of Figures 12 to 15, inclusive,—adapted to enter notches 41 in the internal threads 42 of a cup 43 flanged at one end 44 to engage the ring 39, said cup engaging the external threads of a nut 45 fixed to the shaft 37; and, the corresponding nut member at the other end of the spring, being the externally threaded hub extension 46 of a hollow clutch member 47 loose on shaft 37 is shown in its details in Figures 12 and 13. The member 47 carries within its circumference a plurality of pawls 48 pivoted to the flange of said member at 49, said pawls being held to their work by small springs 50 in engagement with a ratchet wheel 51 carried by gear 52 mounted loosely on the rear end of the shaft 37. Several pawls are employed as shown in Figure 12, due to the fact that, under the stress of the spring 38, great power is transmitted to the ratchet. The pawls are preferably arranged in diametrical pairs, shown in Figure 12, so that each pair will occupy, on diametrically opposite sides of the shaft 37 exactly the same position with reference to the teeth of the ratchet 51. The gear 52 meshes with the gear 53 fixed to the shaft 15 adjacent the front face of the support H. As previously noted, this flexible driving means is duplicated on opposite sides of the longitudinal axis of the shaft 15 correspondingly with the crank mechanism shown in Figures 10 and 11, and each of said spring driving devices operates a gear 52 in mesh with gear 53. As shown in Figure 10, the shafts 10 and 12 are arranged on diametrically opposite sides of the longitudinal axis of the shafts 1 and 15. The arrangement of the various mechanisms and devices shown in Figures 10 to 15 inclusive, and as described in the foregoing, is not to be taken as a limitation of my invention, since within the scope and spirit thereof, I may employ any number of cranks, shafts and springs and arrange them symmetrically about the longitudinal axis of the aligned shafts 1, 15 and 79. And, it is to be understood that I am not limited to the use of coiled spiral springs, such as 38; for, it may be found practical to employ flat torsional or flexible springs, and they may be clustered about the shafts 37. The particular type of spring employed may depend upon the use of the transmission mechanism. The shaft 15 extends rearwardly to and is journaled in the support I, and just beyond the support H is provided with a free-wheel cut-out mechanism comprising the loosely running gear 14 which meshes with the gear 11 on the shaft 10, a similar gear 13, Figures 18 and 19, being carried by the shaft 12 also meshing with the gear 14. The gear 14 is provided with a rearwardly extending hub 14a in which are pivotally mounted pawls 54 engaging a ratchet 55 fixed to the shaft 15. Surrounding the said hub and fixed to the latter, see also Figures 16 and 17, is a hollow member 56, in which are journaled a plurality of grooved worm wheels 57 each mounted on a right and left-hand screw rod 58 threaded in the oppositely extending sockets 59 in semicircular brake members 60 shiftably arranged within the member 56. Meshing with each of the worm wheels 57 is a worm screw 61 extending through the face plate 62 and arranged to slide within the encircling flange 63 of a sleeve 64 fixed on the shaft 15. The sleeve 64 is surrounded by a grooved member 65 into which the smooth end of the worm screw 61 is extended and held by a screw 66. These several parts, shown in detail in Figures 16 and 17 may be duplicated on opposite sides of the longitudinal axis of the shaft 15, see Figure 2. Each of the brake members 60 is provided internally with projections or studs 67 which enter corresponding sockets in the flange of the sleeve 64. The grooved member 65, freely slidable on the sleeve 64, is actuated by a bifurcated arm 68, the bifurcated portion extending into the groove and embracing the hub of the member 65. Thus when the arm 68 shifts the member 65 on the sleeve 64 it actuates the worm screw 61 causing it to act like a rack-bar and rotate the worm wheel 57, thus causing the right and left threaded screw 58 to operate upon the brake members 60 in opposite directions, forcing them outwardly into engagement with the interior surface of the flange of the member 56. The screw 66 is removable so as to enable the screw 61 to be set, or adjusted, properly in the flange of the sleeve 64, when the parts are assembled, thus making it possible to cause the worm-wheel 57 to properly actuate the brake members 60, when required.

The arm 68 encircles and slides upon the fixed rod 69, see Figure 2, which is mounted in the support J at one end and at its opposite end in the rear of the casing A. One side of the end of the arm 68, which surrounds the rod 69, is cupped to receive the spiral spring 70 surrounding the rod 69, and the opposite end of which is received in the cupped member 71 fixed on the rod 69. Thus the spring 70 normally shifts the arm 68 causing its bifurcated end to hold the grooved member 65 against the flange of the sleeve 64. Adjacent the grooved member 65 on the rear end of the shaft 15 is fixed a gear 72 which may mesh with the gear 73 fixed on the short shaft 74 journaled in the support I and extending rearwardly to a journal bearing 75 in the rear end of the casing A. The shaft 74 also has fixed thereto a gear 76, the same being located between the support I and the casing end. The shaft 15 extends to the support I where it is centered in the hub of a flanged internal gear 77. This gear cooperates and meshes with the shiftable gear 78 splined, so as to slide, on the driven shaft 79 journaled in the rear end of the casing A and also journaled and centered in the hub of the internal gear 77. The gear 78 is grooved circumferentially and in said groove extends the bifurcated end of an arm 80, the opposite end of which is formed into a grooved head 81 surrounding and splined, so as to slide, on the rod 69. By shifting the arm 80, the gear 78 may be caused to cooperate with the internal gear 77, or if moved in the opposite direction may be caused to co-operate with the gear 76 fixed to the shaft 74. Thus the speed of the driven shaft 79 will be regulated according to the size of the gear 76 or the gear 77, the driven shaft thus having variable speed in proportion to the speed of the driving shaft 1. And, by intervening a gear 72ᵃ between the gears 72 and 73, the movement of the shaft 79 may be reversed when the gears 78 and 76 are caused to mesh.

From the foregoing it will be seen that the drum B is rigidly supported in the casing by being journaled at one end on the hub 2 and at the other end on the shaft 79, which is the rear terminal member of a practically rigidly supported, longitudinal shaft extending centrally through the casing and drum, but divided into three members 1, 15 and 79, and that the said shaft members 1, 15 and 79, plus the intermediate members including the drum diaphragms or supports C, D, E, F, G and H, and the casing and its support I, provide a staunch, rigid and composite structure eliminating vibration or sag, and enabling the drum and other journaled parts to readily move circularly.

In the enlarged end of the casing A is a crank arm 82 carried on a rock shaft 83 journaled in the casing, the arm 82 at its free end engaging in the groove of the head 81 of the arm 80. Thus, under the proper impulse, the crank arm 82 will shift the arm 80, thus shifting the gear 78 and correspondingly changing and/or reversing the speed of the driven shaft 79. At times, it becomes important to hold the rotary drum B with its flexible driving mechanism from rotation. This is accomplished by a brake mechanism, normally free of the drum, see Figures 22 and 23, consisting of a crank arm 84 carried by the shaft 85 journaled in the enlarged end of the casing adjacent the arm 82. At its outer end, the crank arm 84 engages in the groove of a sleeve 86 splined, so as to slide, on the rod 69 and carrying as a part thereof a worm threaded barrel 87, see Figures 2 and 20 to 23, inclusive, which engages a worm wheel 88 fixed to a rod 89 and having the major portion of its length divided into oppositely screw-threaded members 90 and 91 adapted to engage similarly threaded ears 92 and 93, respectively, carried by the angular plates 94 and 95, respectively, riveted to the adjacent ends of a split brake band 96 of any suitable material lined with highly frictional material 97, such as gandy belting, adapted to engage the exterior surface of the drum B at its extreme rear end. The rod 89 at its worm wheel end is held suitably in a bracket member 98 so that it may be caused to rotate when the arm 84 is caused to oscillate and shift the worm sleeve 87 in mesh with the worm wheel 88.

Figure 24:
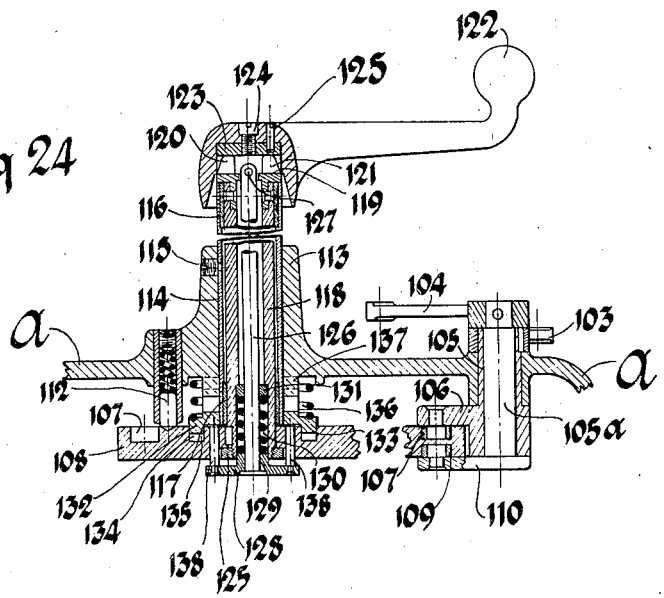
Figure 24 is a transverse sectional view of the controlling mechanism, the figure being taken approximately on the line 24—24 of Figure 25.

Viewing Figures 24 and 25, the controlling mechanism for varying and changing the action of the transmission mechanism will be understood and therein it will be seen that an arm 99, complemental to arm 82, is mounted on the shaft 83, and that an arm 100, complemental to the arm 84, is mounted on the shaft 85. The arms 99 and 100 are outside the casing A and are connected by links 101 and 102, respectively, to crank arms 103 and 104. The arm 103 is fixed to the top of a hollow shaft 105, journaled in the casing A. The shaft 105 also carries an arm 106 having at its free end an anti-frictional roll which operates in a cam groove 107 in the upper surface of a disk 108. The bottom of the disk 108 is likewise provided with a cam groove 109 in which the anti-frictional free end of an arm 110 operates, the same being carried by the rock shaft 105ᵃ, the latter also carrying at its upper end the crank arm 104. The disk 108 is provided in its upper surface with a plurality of depressions 111 placed so as to be engaged by a yielding pin 112 of conventional form mounted in the casing to hold the disk in the various positions of adjustment desired for obtaining predetermined results in the operation of the driving mechanism. In Figure 24, the manually manipulated controlling mechanism is shown and therein the cam disk 108 is shown with its grooves 107 and 109. This view is broken out and in section such as to show details of construction otherwise obscured. The surface of the casing is enlarged to form an extensive bearing 113, and therein a sheath 114 is fixed by a screw 115. The sheath extends from the surface of disk 108 to a point enabling it to support a control-handle in convenient position to be manipulated by the operator. The view is shown broken in mid-length so as to indicate indefinite length and suggest the intervention of the steering wheel near which the handle may be located. At its upper end the sheath is internally reduced and provided with a short bushing 116. The bottom of the sheath is treated similarly and provided with a bushing 117. Within the sheath and centered by the bushings is a hollow bearing 118, to the top of which is fixed a flanged collar 119, overlapping the top of the sheath 114 and adjacent bushing, and the top of which is provided with two upstanding lugs 120, 121 acting as fulcra for the handle 122, hollowed and flared to receive the lugs and work free of the collar and sheath. The bottom of hollow of the handle is provided with a saddle 123 arranged to engage the lugs 120, 121, said saddle being fixed in place by a screw 124 and pin 125, the latter preventing rotation. The lower end of the bearing 118 extends through the cam-disk 108, is reduced, externally threaded and provided with a nut 125 countersunk in the bottom of the disk 108, thus holding the bearing in place. Extending through the bearing is a rod 126, the top of which is pivoted at 127 to the interior of the handle and the bottom of which is provided with a disk 128 loose thereon and having a projection 129 working in the end of the bearing 118 and supporting a spiral spring 130 therein. A washer 131 properly centers the inner end of the spring, the operation of which latter is to tend normally to depress the rod 126 and maintain the handle in contact with its fulcra 120, 121. Surrounding the sheath near the disk is a circular pawl 132 having depending teeth 133 adapted to engage teeth 134 in the bottom of groove 135 encircling the axis of the disk 108. The pawl 132 is normally depressed by spiral spring 136 properly centered by projection 137 on the bottom of the casing A. When it is desired to lift the pawl 132, the handle 122 is tilted on one of the fulcra lugs, lifting the rod 126 with its disk 128, which carries several pins 138, passing through the cam disk and engaging the bottom of the pawl. At this time the bearing 118 may be turned by the handle 122, thus shifting the cam 108 and overcoming the detent pin 112. When the proper adjustment has been made, the pawl 132 is allowed to drop into the groove 135 and the detent into a depression 111, one of which latter is located at each operating position. In the gear brake position, the pawl 132 engages the teeth 134 in the groove 135, thus holding the cam disk positively from rotation.

To avoid the possibility of the brake band 96 buckling at its farthest point from the adjusting rod 89, and to cause the band to operate as a unit upon the drum B, I provide a stationary member or post 139, Figure 22, fixed in any desirable manner to the inside of the casing and arranged at a point diametrically opposite the point of application of power to the plates 94, 95. A stirrup 140 is fastened to the brake band 96, and engages the post 139. The stirrup is provided with a socket through which the post extends and in which a spring 141 is seated at one end and which, at its other end, engages the post. A screw-bolt 143 slides freely in the socket, is surrounded by the spring, and is threaded in the post 139. By adjusting the bolt 143, more or less clearance can be obtained between the brake band 96 and drum B. By this means the brake band is prevented from buckling or swelling when released and the band is compelled to operate as a unit for application and release of pressure throughout the circumference of the drum.

It will be understood, notwithstanding the schematic view of Figure 1 and the character of the illustration of Figure 2, that the trains of devices constituting units in my transmission mechanism, and embodied within the drum B, may be arranged in pairs of units on opposite sides of the longitudinal axis of the driving shaft 1. In some instances, the devices will be only duplicated on opposite sides of the longitudinal axis of the driving shaft, while in other instances they will be arranged circularly around said axis in numbers consistent with space, balance, stability, and power required. Examples of such details for the sake of clearness and proper understanding of my invention, have been carried out in the several figures of the drawings illustrating the trains of mechanism. Figures 5 and 6, 10 and 11, 18 and 19 show such multiplex arrangements of certain of the devices, and it is believed that therefrom it will be well understood how the unitary trains of devices will be arranged to provide for perfect balance of such trains of devices in the drum; and it will also be understood therefrom how the springs 38 interact and cooperate to reinforce each other in applying power for driving purposes.

Having thus described the details of construction of my transmission mechanism, the following brief description of the mode of operation will be found sufficient.

Particularly referring to Figures 1 and 2, it will be understood that the primary driving shaft is at the left-hand end of the transmission mechanism and indicated by 1, while the driven or service shaft of the mechanism is at the right-hand end and indicated by 79, Figure 2. It will also be understood that the drum shown in Figure 1 and in the composite view of Figure 2 is rotatable, in clockwise direction, looking in the direction of the driven shaft 79, from the left-hand end of Figures 1 and 2 for its functional purposes, during the operation of driving the mechanism. The controlling mechanism of Figures 24 and 25 is to be arranged conveniently for manipulation by the operator and, for brevity and a specific application of the invention, I will describe the operation of the mechanism as applied to a motor vehicle of the ordinary automobile or road type driven by a hydrocarbon engine. In the specific application of my transmission mechanism to a road vehicle or automobile, the driving shaft is coupled in usual manner to the hydrocarbon engine and the driven shaft 79 is coupled in usual manner to the driven axle of the car.

The engine, or prime mover, being started, the shaft 1 will be given rotation in a clockwise direction, looking in the direction of the driven shaft 79, from the left-hand end of Figures 1 and 2 imparting its movement to gear 7 which, being in mesh with the gear 8, drives the latter, the shaft 10 and the gear 11 in counter-clockwise direction. This train of gear and the shaft 10 may be duplicated, as shown in Figures 5 and 6, by the addition of a gear 9 to mesh with gear 7, and mounted on a shaft 12 journaled to the same supports of the drum B as the shaft 10. This duplication of the gear-train has a tendency to give stability and strength to the driving mechanism. The drum B, in which all the said parts and other driving mechanism are mounted, is provided with a pawl 4 pivotally mounted thereon adjacent the front end of the casing A and is under control of a spring 5, Figure 3. This pawl engages the ratchet 3 made as a fixture on the front end inside of the casing A, making it impossible for the drum to turn save in a clockwise direction, although there is a normal tendency for the drum to turn in a counterclockwise direction. The pin 6 set in the drum head C limits the outward movement of the retaining end of the pawl 4. This structure is shown in details in Figures 3 and 4, and therein the duplicate shaft 12 is also shown. The gear 11 meshes with the gear 14 which is loose on the shaft 15 journaled in the supports G and H, and said gear 11 drives the gear 14 in a clockwise direction, see the arrow Figure 1. The pawl 54, carried by the gear 14 in its extended hub 14ᵃ, see Figures 1, 2, 18 and 19, engages the ratchet 55 fixed on the shaft 15 and drives the latter in clockwise direction. The shaft 15 extends rearwardly to the casing support I, at which point it is journaled and centered in the extended hub of the internal gear 77, which meshes with a shiftable gear 78 splined to the driven shaft 79. The gears 77 and 78 constitute a gear clutch. This mechanism just described constitutes the low gearing of the transmission and also the direct positive drive thereof. In Figures 18 and 19 also will be seen the duplication of the gearing and shafting just described, and therein will also be seen the duplication, on opposite sides of the longitudinal axis of the shafts 1 and 15, of the shafts 37 which carry the flexible spring connection 38, etc.

Means are provided for reversing the motion of the driving shaft 79 consisting of the gear 72 fixed to the shaft 15 which meshes with an idler gear 72ᵃ, in turn meshing with the gear 73 fixed to the shaft 74 journaled in the support I and the rear end of the casing A at 75. Adjacent the casing the shaft 74 is provided with a gear 76 which will mesh with the gear 78 when the latter is shifted, by the connection 80 from the control mechanism presently described, along the shaft 79 into engagement with said gear 76. This produces from the clockwise rotation of the shaft 15, looking in the direction of the shaft 79 from the left-hand end Figures 1 and 2 the counter-clockwise or reverse movement of the shaft 79. When the shiftable gear 78 is located in the space between the gears 76 and 77, the gear 78 will be in neutral position and will have no driving effect upon the driven shaft 79. The several positions of the gear 78 are regulated by the said control means presently described.

When the gear 78 is in the neutral position just described, the vehicle will not be under the driving influence of the prime mover. Up to this time, the speed of the parts may not be sufficient to cause the rotation of drum B.

The flexible connection of the transmission embodying the several spiral springs 38, Figures 1, 2, 12 to 15, inclusive, is under control of the governor shown in Figures 1, 2, and 7 to 9, inclusive, and therein it will be seen that rotation of the shaft 1 will cause the multiple crank 17 to rotate which, in turn, will rotate the gear 20 having the extended hub 21 on which the ball clutch is mounted. Rapid rotation of the clutch members, normally lying close together, will cause the ball weights 29 to tend to fly outwardly as the result of centrifugal force, resulting in forcing the member 27 away from the member 24 and overcoming the frictional latches 25. The movement of member 27 along the journal 21 compresses the spring 32 and causes the teeth 30 to engage the teeth 31 of the clutch member 22 journaled in the support F of the drum. The locking together of the two members 27 and 22 causes the rotation of the crank 23, 34 and 33, causing the movement of the link 35 and the oscillation of the connected crank arm 36 mounted on the shaft 37. The details of the crank mechanism are shown in Figures 10 and 11, and therein it will be seen that the flexible spring connection or drive is duplicated on opposite sides of the longitudinal axis of the driving shafts 1 and 15, and in these figures also will be seen the duplication of the low speed or direct driving mechanism including the shafts 10 and 12. The purpose of the foregoing mechanism is to delay the action of the crank mechanism on the spring coil of the yielding device until the low gearing drive has brought the driven mechanism up to a predetermined speed, whereupon the governor operates to bring into action the crank mechanism and flexible transmission means.

The yielding part of the transmission mechanism, including the crank mechanism, the shafts 37 actuated thereby, and the plurality of spiral springs 38 employed in the drum, is caused to operate upon the driven shaft 15 and the gearing connected thereto through the medium of the gear 52 and gear 53 fixed to the shaft 15. The details of this yielding transmission mechanism have been fully described in the foregoing with reference to Figures 10 to 15, inclusive, and it will be understood that one end of the springs 38 is fixed to the driven end of the shafts 37, near the crank 36, while the driving end of the springs 38 is free to turn on the shafts 37 and thus cause the gears 52 to turn on said shafts at their other ends. The springs 38, therefore, are caused to turn and twist torsionally on shafts 37 because driven by power at their left ends, Figure 2, and resisted by load on the gears 52, 53, etc., at the other end. At first, the winding of the springs upon the shafts 37 has no immediate effect upon the driven shaft 15, or the load imposed thereon or the train of gears extending therefrom; but, eventually, as the twisting of the springs continues and the tension thereof increases, the spring power is transmitted through gear 52, gear 53, and to shaft 15, and the flexible drive of the springs will be imposed upon the shaft 15 and cause the drum to rotate due to the load on the driven shafts 15 and 79, and the resistance to the drive of the gears 52, 53. It is to be noted that the springs 38 are wound in counter-clockwise direction, looking toward the shaft 79 from the left end of Figure 2, and that the resistance thereto by gears 52 and 53 and the load on the shafts 15 and 79, tend to cause the drum B to rotate around the aligned shafts and revolve the springs 38 about said shafts in a clockwise direction, looking from the left end of Figures 1 and 2. The spring power will thus aid in the drive of the transmission shafts until the speed of the latter and the speed of the drum are equal. In this connection, the springs 38 act in the place of the shafts 37 to drive the gears 52, and these yielding driving devices 38 operate as a flexible lever arm giving a varying torsional stroke to the gears 52, which stroke is caused to be modified by the load imposed upon the shaft 15 and the power transmitted from the crank 23; that is to say, the devices 38 become cushioning means to absorb shock and the effects of undue resistance to load imposed upon the direct gear drive. Should the load increase, its effect is not felt directly upon the gear or transmission shafts, but upon the springs which will neutralize the retarding tendency of the load upon the driven shafts and absorb the same or any shock tendencies resulting therefrom. If such increased load condition increases abnormally, it will be absorbed by the spring transmission devices with a tendency to unwind the springs or neutralize their driving tendency. This is an important feature of my invention and upon it I desire to lay stress, and especially from its aspect of being a yielding connection, of power storage and cushioning type, between the driving and driven end of a direct and positive gear transmission mechanism. The springs are in the nature of motors and power is gradually stored in them by the multiplex crank mechanism of Figures 10 and 11, and the stored power is utilized for the purpose of causing the positive gear driving mechanism to yield instantly an excessive load is imposed upon the latter, thus avoiding any shocks or braking strains. When the driving mechanism is at a high rate of speed, the yielding connection, or compound motor, supplements the driving gear train for the purpose of increasing speed, and in so doing the entire drum and its contained mechanisms and interacting devices constitute a single powerful driving device intervened between the primary driving or motive power and the driven shaft or load or work to be done. The multiplex crank mechanism operates as a medium by which to gradually store power in the compound motor, and this operation is the result of the rotation of the crank mechanism intevened between the governor and the spring motors, the governor coming slowly into action to operate the crank mechanism, and the crank mechanism operating slowly to gradually energize the motors or wind up the springs until sufficient power is stored therein to cause them to impart positive movement to the gear 52, and in turn to the gear 53 and the shaft 15 carrying the same. The ratchet mechanism, shown in Figure 12 in its details, for holding the windings of the spring is very strong. The winding of the spring as just described is in counter-clockwise direction, and this movement is imparted to the gear 52 which, meshing with the gear 53, cause it and its shaft to rotate in clockwise direction corresponding to the direction of movement imparted by the trains of gearing terminating at the gear 14. At first, the tendency of the mechanism described in the foregoing is to wind the springs without affecting the drive; but, as the speed of the driving gears is increased, the springs will be rapidly wound and power stored therein until they become approximately one with the rigid or gear driving mechanism, resulting in rotating the drum B.

As I have shown, the mechanism in and including the drum A has a tendency to rotate in a counterclockwise direction, when viewed from the driven end, when the gear 78 is in positive forward driving connection and when the governor members 22 and 27 are in a coupled position, and when power is applied to shaft 1, due to the effort to overcome the inertia of the driven mass, viz., the vehicle. The clockwise direction of rotation of the drum is attained when the inertia of the driven mass has been partially, or wholly, overcome through the efforts of the positively connected gear train 7, 8, 9, 11, 13 and 14, which effort depends upon the amount of power applied to shaft 1, from the torsional forces acting in a clockwise direction and coming originally from shaft 1 and making themselves felt on shafts 10 and 12, partially on gear 16, which is connected directly to the drum, and on gear 20 through the various connecting members leading up to and including gears 52. Again, when the driven mass has been started and brought up to a slow speed, say less than 10 M. P. H., which speed is insufficient to cause the governor couplings 22 and 27 to be connected, the drum will nevertheless assume a clockwise rotation immediately the inertia of the drum mass has been overcome through the gear train 7, 8, 9, 11, 13 and 14. This clockwise rotation of the drum will be caused by the clockwise rotational forces exerting themselves upon the shafts 10 and 12. In other words, the clockwise rotation of the drum will be attained when the forces which act in a clockwise direction of rotation are greater than the inertia of the driven mass.

The drum B at its forward end is provided with the pawl 4 pivotally mounted on the support C, the said pawl being adapted to engage a rigid circle of ratchet teeth 3 provided on the forward end of the casing A on the inside thereof in the chamber formed thereby with the support C, see Figures 1 and 2. The operation of this ratchet device is to prevent the drum from having any retrograde movement; that is to say, any tendency of the drum to operate or turn in a counterclockwise direction is overcome and any such movement is prevented by the engagement of the pawl 4 with the ratchet 3.

If it is desired, during the operation of the transmission, to prevent free-wheeling and cut out the mechanism permitting the same, the controller, presently described, will be shifted so as to cause the connection 68 to shift the member 65 toward the rear of the casing A on the extended hub 65 of the clutch mechanism carried in the casing 56 keyed to the hub of the gear 14ᵃ and also fixed to the shaft 15. The shifting of the member 65 causes the screws 61 to rotate the worm wheels 57, which in turn will rotate the right and left screws 58 carried by the frictional clutch plates 60 within the casing 56. Said clutch plates will be forced outwardly, thus creating a brake upon the casing 56 which, being connected to the gear 14, will create a lock of the driving means 11, 10, 8 and 7 to the driving shaft 1. This will result in compelling the drum B to rotate on its axis carrying with it as an inert mass all of the mechanism encased within it.

I have provided a gear-brake for the mechanism described in the foregoing consisting of a brake band to be applied to the circumference of the drum B at the rear open end thereof. By properly manipulating the controlling mechanism presently described, the arm 84 will shift the helical sleeve on the rod 69. The sleeve will rotate the worm wheel 88 and rotate the rod 89. The opposite screw-threads 90, 91 of the rod will draw the free ends of the brake band 96 together, thus clamping the drum B and holding the same frictionally. The post with its spring-impelled bolt 143 will avoid the tendency of the brake band to shift with the drum and also to buckle outwardly, this insuring positive grip of the band upon the drum. It will be seen from the foregoing description of the gear-brake that the locking of the brake drum B will cause the gears 14, 11, 8 and 7 to rotate on their respective axes thereby causing the shaft 1 to rotate at a greater speed than the shaft 79.

The controlling mechanism shown in Figures 24 and 25 has been several times referred to. This controlling mechanism may be shifted from neutral (N) position to reverse (R) position. Or it may be shifted from neutral position to forward driving position (F). Or to the non free-wheeling (NFW) position. Or to the gear brake (GB) position. All these positions may be yieldingly held by the stop pin 112 or by the intermeshing of the ratchet teeth on the circular pawl 132 and in the groove 135 of the disk 108. The arms 103 and 106 connected to the rod 101, crank arm 99 and crank arm 82 will shift the member 80, as previously described. The arms 110 and 104 will shift the rod 102, arm 100, arm 84 to shift the helical sleeve as previously described. The member 68 will be held in normal position shown in Figure 2, due to the connection of the spring 70 to the fixed cupped member 71, for the purposes already described. The controlling arm 122, Figure 24, by reason of the connection between it and the disk 108 previously described, will rotate the latter. The arm 122 may be teetered on the lugs 120 and 121, and the rod 126 may be raised and lowered when the foregoing action occurs. The result of the movement of the said controlling arm 122 from one position to another, as just indicated, will bring about the following results:

When the handle 122 is in the neutral (N) position, the connections to the gear 78 will hold the latter in the space between gears 76 and 77, resulting in no drive of the shaft 79.

With the handle 122 in the position of forward drive (F) the said connections to gear 78 will shift it into mesh with the gear 77, making effective the low drive train of mechanism with all the possibilities of the yielding transmission mechanism heretofore noted.

When the handle 122 is in the position of non-free-wheeling (NFW) the free-wheel cut-out clutch of Figures 16 and 17 operates, that is, functions as heretofore stated.

When the handle 122 is in the position of gear-brake (GB) the functions, emanating from applying the drum-brake mechanism of Figures 20 to 23, will be produced.

By shifting the handle 122 to the mechanism reversing position (R), the connections to gear 78 will shift the latter into mesh with the gear 76. This shift of the handle to reverse position (R) can be accomplished from any of the other positions when desired or required.

What I claim and desire to secure by Letters Patent is:

1. In combination with an enclosing casing, a variable speed power transmission mechanism mounted within the casing, said transmission mechanism including a driving shaft journaled in the casing, a driven shaft journaled in the casing in alinement with the driving shaft, a positive power transmission means between the two shafts, including a slip clutch, and a yielding power storage and power transmission mechanism coupled with the two shafts whereby periodically said yielding mechanism may interact with the positive driving mechanism for actuating the driven shaft with a tendency to enable the positive driving mechanism to yield when the power storage mechanism goes into action.

2. In combination with an enclosing casing, a variable speed power transmission mechanism mounted within the casing, said transmission mechanism including a driving shaft journaled in the casing, a driven shaft journaled in the casing in alinement with the driving shaft, a positive power transmission means between the two shafts, including a slip clutch, a yielding power storage and power transmission mechanism coupled with the two shafts whereby periodically said yielding mechanism may interact with the positive driving mechanism for actuating the driven shaft with a tendency to enable the positive driving mechanism to yield when the power storage mechanism goes into action, and differential gearing interposed between the driven shaft and the positive driving mechanism whereby change of speed may be brought about.

3. In combination with an enclosing casing, a variable speed power transmission mechanism mounted within the casing, said transmission mechanism including a driving shaft journaled in the casing, a driven shaft journaled in the casing in alinement with the driving shaft, a positive power transmission means between the two shafts, including a slip clutch, a yielding power storage and power transmission mechanism coupled with the two shafts whereby periodically said yielding mechanism may interact with the positive driving mechanism for actuating the driven shaft with a tendency to enable the positive driving mechanism to yield when the power storage mechanism goes into action, differential gearing interposed between the driven shaft and the positive driving mechanism whereby change of speed may be brought about, and a controlling mechanism interacting with the differential gearing for controlling the action of the latter.

EDWIN C. McFARLANE.